US012587133B2

(12) United States Patent
Ito et al.

(10) Patent No.: US 12,587,133 B2
(45) Date of Patent: Mar. 24, 2026

(54) CONTROL DEVICE FOR VEHICLE

(71) Applicant: TOYOTA JIDOSHA KABUSHIKI KAISHA, Toyota (JP)

(72) Inventors: Satoru Ito, Mishima (JP); Hiroki Murata, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 18/882,758

(22) Filed: Sep. 12, 2024

(65) Prior Publication Data

US 2025/0175122 A1     May 29, 2025

(30) Foreign Application Priority Data

Nov. 27, 2023    (JP) ................................. 2023-200201

(51) Int. Cl.
| | |
|---|---|
| *H02S 40/10* | (2014.01) |
| *B60R 16/03* | (2006.01) |
| *B60S 1/08* | (2006.01) |

(52) U.S. Cl.
CPC .............. *H02S 40/10* (2014.12); *B60R 16/03* (2013.01); *B60S 1/08* (2013.01)

(58) Field of Classification Search
CPC . H02S 40/10; H02S 30/20; B60S 1/08; Y02E 10/50
USPC .......................................................... 701/48
See application file for complete search history.

(56) References Cited

U.S. PATENT DOCUMENTS

| | | | | |
|---|---|---|---|---|
| 6,094,981 | A | * | 8/2000 | Hochstein ......... B32B 17/10036 |
| | | | | 73/170.17 |
| 7,718,923 | B1 | * | 5/2010 | Hansen .................. B60J 1/2094 |
| | | | | 219/202 |
| 2008/0197122 | A1 | * | 8/2008 | Gober .................... B60J 1/2091 |
| | | | | 219/203 |
| 2011/0006050 | A1 | * | 1/2011 | Nee .......................... H05B 6/36 |
| | | | | 219/203 |
| 2020/0086346 | A1 | * | 3/2020 | Kobrin ................. H10N 30/706 |
| 2020/0194603 | A1 | * | 6/2020 | Youn ....................... H02S 30/10 |
| 2023/0140222 | A1 | * | 5/2023 | Van Straten ........... B60J 1/2011 |
| | | | | 296/97.1 |

FOREIGN PATENT DOCUMENTS

| | | | | |
|---|---|---|---|---|
| JP | 2014-125100 A | | 7/2014 | |
| KR | 20160142979 A | * | 12/2016 | ............. H02S 40/10 |

* cited by examiner

*Primary Examiner* — Grant Moubry
*Assistant Examiner* — Joshua Campbell
(74) *Attorney, Agent, or Firm* — SoraIP, Inc.

(57) ABSTRACT

A control device for a vehicle, comprising: a cleaning mechanism for cleaning an outer surface of a window glass; and a flexible solar cell module capable of generating electricity by being irradiated with sunlight, wherein the solar cell module is deployed along an inner surface of the window glass, and the control device is capable of storing the solar cell module, the control device including a controller for controlling the deployment and storage of the solar cell module and the cleaning mechanism, wherein the controller includes an expansion determination unit for determining that the solar cell module is deployed, and a cleaning mechanism control unit for operating the cleaning mechanism so as to clean the outer surface of the window glass when it is determined that the solar cell module is deployed.

4 Claims, 3 Drawing Sheets

CONTROL DEVICE FOR VEHICLE

CROSS-REFERENCE TO RELATED APPLICATION

This application claims priority to Japanese Patent Application No. 2023-200201 filed on Nov. 27, 2023, incorporated herein by reference in its entirety.

BACKGROUND

1. Technical Field

The present disclosure relates to a control device for a vehicle including a solar cell module that generates electric power by irradiation with sunlight.

2. Description of Related Art

Japanese Unexamined Patent Application Publication No. 2014-125100 (JP 2014-125100 A) discloses an in-vehicle solar cell module that can be expanded along a window of a vehicle and can be retracted when electric power is not generated. The in-vehicle solar cell module of JP 2014-125100 A includes a thin-film solar cell. The solar cell is formed in a film shape having a five-layer structure sandwiched between resin films, and has flexibility. Therefore, the in-vehicle solar cell module described in JP 2014-125100 A can be rolled up or folded and retracted at a position away from the window of the vehicle. In JP 2014-125100 A, the solar cell structured as described above is disposed in the entire region of a roof and a window glass of the vehicle. Therefore, the solar cell described in JP 2014-125100 A can be expanded as a so-called sunshade on the vehicle cabin side along the window of the vehicle while the vehicle is parked. Thus, the area of the solar cell disposition can be increased. The solar cell can be retracted while the vehicle is traveling. Thus, the visibility of a driver and passengers can be secured while the vehicle is traveling.

SUMMARY

In the solar cell described in JP 2014-125100 A, the installation area of the solar cell is increased by being expanded along the window glass while the vehicle is parked. Therefore, the amount of electric power to charge a battery can be increased. Dirt or foreign matter may adhere to the window glass due to weather, conditions of a traveling road, etc. In particular, a windshield is susceptible to such external factors during traveling. Even when the solar cell is expanded along the window glass, there is a possibility that the solar cell is not irradiated with sunlight due to such dirt, foreign matter, etc. As a result, there is a possibility that the power generation efficiency of the solar cell decreases and a sufficient power generation amount cannot be secured though the installation area of the solar cell is increased.

The present disclosure has been made in view of the above technical problem, and an object of the present disclosure is to provide a control device for a vehicle that can suppress a decrease in power generation amount and power generation efficiency in a solar cell disposed along a window glass for blocking light in a vehicle cabin.

In order to achieve the above object, the present disclosure provides a control device for a vehicle including:
a window glass;
a cleaning mechanism configured to clean an outer surface of the window glass; and a solar cell module configured to generate electric power by irradiation with sunlight and having flexibility.

The solar cell module is expandable along an inner surface of the window glass and retractable to an outside of the inner surface of the window glass.

The control device includes a controller configured to control expansion and retraction of the solar cell module and to control the cleaning mechanism.

The controller includes:
an expansion determination unit configured to determine whether to expand the solar cell module along the inner surface of the window glass; and
a cleaning mechanism control unit configured to operate the cleaning mechanism to clean the outer surface of the window glass when the expansion determination unit determines to expand the solar cell module.

In the present disclosure, the control device may further include
a detector configured to detect a generated electric power amount of the solar cell module. The controller may further include a generated electric power amount detection unit configured to detect that the generated electric power amount is smaller than a predetermined value when the solar cell module is generating electric power.

The cleaning mechanism control unit may be configured to operate the cleaning mechanism to clean the outer surface of the window glass when the generated electric power amount detection unit detects that the generated electric power amount is smaller than the predetermined value.

In the present disclosure, the predetermined value may be a value set based on a decrease amount of the generated electric power amount that is a difference between the generated electric power amount when the solar cell module is expanded and starts power generation and a current generated electric power amount.

In the present disclosure, the predetermined value may be a threshold value set based on a radiation amount of the sunlight that irradiates the solar cell module and predetermined specifications of the solar cell module.

With the control device for the vehicle, the solar cell module can selectively be expanded along the inner surface of the window glass of the vehicle. Specifically, while the vehicle is traveling, the solar cell module is retracted in a pillar, a pillar trim, etc. on the outside of the inner surface of the window glass. Therefore, it is possible to secure the field of view of the driver and the passengers while the vehicle is traveling. While the vehicle is parked, the solar cell module is expanded along the window glass and functions as a sunshade in the vehicle cabin. Therefore, the installation area of the solar cell module in the vehicle can be increased, and thus the generated electric power amount of the solar cell module can be increased. When the solar cell module is expanded, the cleaning mechanism including a wiper and a washer fluid of the vehicle is operated to clean the window glass. That is, the solar cell module is expanded in a state in which dirt, foreign matter, etc. on the window glass is removed. Therefore, it is possible to suppress a decrease in the generated electric power amount of the solar cell module due to dirt or foreign matter adhering to the window glass.

In the control device, the cleaning mechanism is operated even when it is detected that the generated electric power amount is smaller than the predetermined value while the solar cell module is generating electric power. Since the vehicle is parked outdoors to generate electric power by the solar cell module, dirt or foreign matter may adhere to the window glass even while the solar cell module is generating electric power. When the generated electric power amount of the solar cell module decreases, there is a possibility that dirt or foreign matter adheres to the window glass. Therefore, when the generated electric power amount of the solar cell module decreases, the cleaning mechanism is operated to clean the outer surface of the window glass, thereby suppressing a decrease in the generated electric power amount of the solar cell module.

In the control device, the cleaning mechanism is operated to clean the outer surface of the window glass in the case where the decrease amount of the generated electric power amount of the solar cell module is the predetermined value. For example, the generated electric power amount of the solar cell module varies depending on the radiation amount of sunlight or temperature. Therefore, the generated electric power amount of the solar cell module may change in such a manner that the generated electric power amount gradually decreases over time and increases after the decrease. In such a case, no dirt or foreign matter adheres to the window glass. Therefore, the decrease in the generated electric power amount of the solar cell module cannot be suppressed even when the cleaning mechanism is operated. By determining whether the generated electric power amount of the solar cell module is smaller than the predetermined value, it is possible to reduce the operation of the cleaning mechanism even though no dirt or foreign matter adheres to the window glass. Thus, it is possible to effectively suppress the decrease in the generated electric power amount of the solar cell module.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
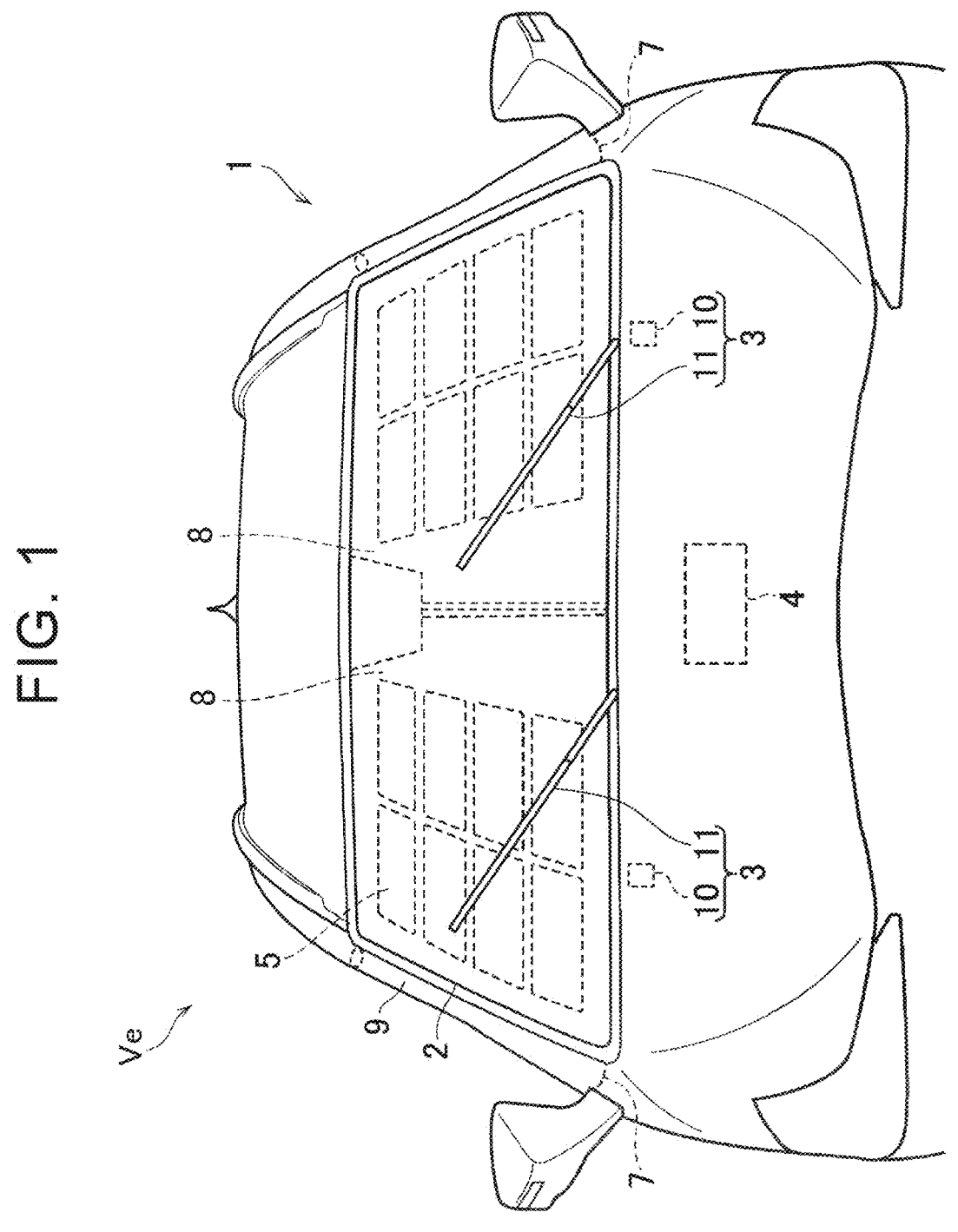
FIG. 1 is a front view showing a state in which an example of a solar cell module in an embodiment of the present disclosure is deployed along an inner surface of a windshield of a vehicle.

Hereinafter, the present disclosure will be described based on an embodiment shown in the drawings. Note that the embodiments described below are merely examples of a case where the present disclosure is embodied, and the present disclosure is not limited thereto.

An example of the solar cell module 1 according to the embodiment of the present disclosure will be described with reference to FIG. 1. As shown in FIG. 1, the solar cell module 1 according to the embodiment of the present disclosure can be deployed along an inner surface of a windshield (window glass) 2 of a vehicle Ve. Specifically, the solar cell module 1 is stored at a position deviated from the windshield 2 so that the driver and the occupant can see the outside of the vehicle Ve during traveling. Conversely, the solar cell module 1 is deployed along the inner surface of the windshield 2 during parking. Therefore, the solar cell module 1 can block the sunlight emitted into the vehicle cabin. Therefore, the sunshade functions as a sunshade capable of suppressing an increase in temperature in the vehicle cabin. Further, the solar cell module 1 is deployed along the inner surface of the windshield 2, so that the installation area of the solar cell module 1 can be increased. Therefore, the amount of electric power generated through the solar cell module 1 can be increased. That is, the solar cell module 1 functions as a so-called solar sunshade capable of suppressing an increase in temperature in the vehicle cabin by blocking sunlight and generating electric power by irradiation with sunlight.

The vehicle Ve can operate accessories, electronic devices, and the like in the vehicle Ve by electric power generated by the solar cell module 1. The vehicle Ve may be a conventional vehicle such as an engine-driven vehicle, a battery electric vehicle, a hydrogen-powered vehicle, or a hybrid electric vehicle, fuel cell electric vehicle. In a vehicle including a motor as a driving force source such as a hybrid electric vehicle or a battery 25 electric vehicle, the vehicle may be driven by supplying electric power generated by the solar cell module 1 to the motor. Further, the present disclosure is not limited to a manually-driven vehicle that travels to a destination by driving operation by a driver, and may be an automatically-driven vehicle that travels to the destination by automatically controlling the driving operation. The vehicle Ve mainly includes the above-described solar cell module 1, a cleaning mechanism 3 for cleaning the outer surface of the windshield 2, and a controller 4 for controlling the cleaning mechanism.

The solar cell module 1 generates electric power by mainly converting light energy such as sunlight into electrical energy by utilizing a photovoltaic effect generated by irradiation of sunlight. The solar cell module 1 includes a plurality of solar cells 5 formed of thin-film solar cells using a semiconductor thin film as a power generation layer. The solar cell 5 is a so-called CIS type solar cell using a compound semiconductor mainly made of copper (Cu), indium (In), and selenium (Se). The solar cell 5 has layers such as a CIS light-absorbing layer, a transparent electrode layer, a buffering layer, a back electrode layer, a precursor layer, and a resinous substrate formed of the compound.

Although not shown, terminals (not shown) provided in the solar cells 5 are electrically connected to each other in the plurality of solar cells 5. Electric power generated by the plurality of solar cells 5 electrically connected in this manner is supplied to the battery 6 via a lead wire (not shown) or the like provided in a roof or the like of the vehicle Ve. Note that the electrical connection between the solar cell module 1 and the battery 6 may be selectively performed using a magnetic material or the like. Further, the solar cell module 1 may be a silicon-based solar cell using a silicon semiconductor in which a thin film is formed by attaching a gas containing a raw material such as silicon to a substrate. Alternatively, the solar cell module 1 may be an organic solar cell or the like formed by coating a resin or the like with an organic semiconductor such as a conductive polymer or fullerene dissolved in a solvent.

As illustrated in FIG. 1, the solar cell module 1 configured as described above is stored and deployed by a guide mechanism 7 provided on the indoor side of the vehicle Ve. Specifically, the guide mechanism 7 is provided with two guide sheets 8 that are actuated by an actuator or the like. The solar cell module 1 is integrally disposed with the guide sheet 8. The guide mechanism 7 includes, for example, guide rails (not shown) provided on the upper side and the lower side of the windshield 2. The guide sheets 8 are guided by the guide rails and deployed along the inner surface of the windshield 2 from the left and right sides of the windshield 2 toward the center. Thereby, the solar cell module 1 is configured to be deployed along the inner surface of the windshield 2. When the solar cell module 1 is stored, the guide sheet 8 is wound up by the guide mechanism 7. As a result, it is accommodated in the pillar 9 of the vehicle Ve constituting the window frame of the windshield 2, a pillar trim (not shown) provided along the pillar 9, and the like. Thereby, the solar cell module 1 is stored outside the inner surface of the windshield 2. It should be noted that the position where the solar cell module 1 is stored is sufficient as long as the field of view of the driver and the occupant can be secured. Therefore, the guide mechanism 7 may be disposed at a position slightly overlapping the inner surface of the windshield 2, or the guide sheet 8 may slightly overlap the inner surface of the windshield 2 in a state where the solar cell module 1 is stored.

The cleaning mechanism 3 is provided on a cowl top panel (not shown) of the vehicle Ve, and removes dirt and foreign matters adhering to the outer surface of the windshield 2. The cleaning mechanism 3 includes a wiper 10 for wiping out dirt, a washer liquid for jetting to the outer surface of the windshield 2 via the washer nozzle 11, and the like. For example, when dirt such as sand, dust, and mud adheres to the outer surface of the windshield 2, the dirt is floated from the windshield 2 by a washer liquid, and the floated dirt is wiped off by the wiper 10. Although not shown in the drawings, the cleaning mechanism 3 can be operated by, for example, operating a lever provided in the vicinity of a steering wheel in the driver's seat of the vehicle Ve or pushing the switch. In addition, the cleaning mechanism 3 according to the embodiment of the present disclosure can be operated by a control signal of the controller 4 described later.

The controller 4 is composed mainly of a microcomputer including a processor (CPU), a storage device (RAM or ROM), and an input/output device (input/output interface). The controller 4 is configured to perform an operation according to a predetermined program using various sensors provided in the vehicle Ve, data inputted from the outside, data stored in advance, and the like, and to output a result of the operation as a control command signal. For example, the controller 4 executes a function that matches a predetermined purpose by the processor loading the program stored in the recording medium into a work area of the storage unit, executing the program, and performing various controls through the execution of the program.

Figure 2:
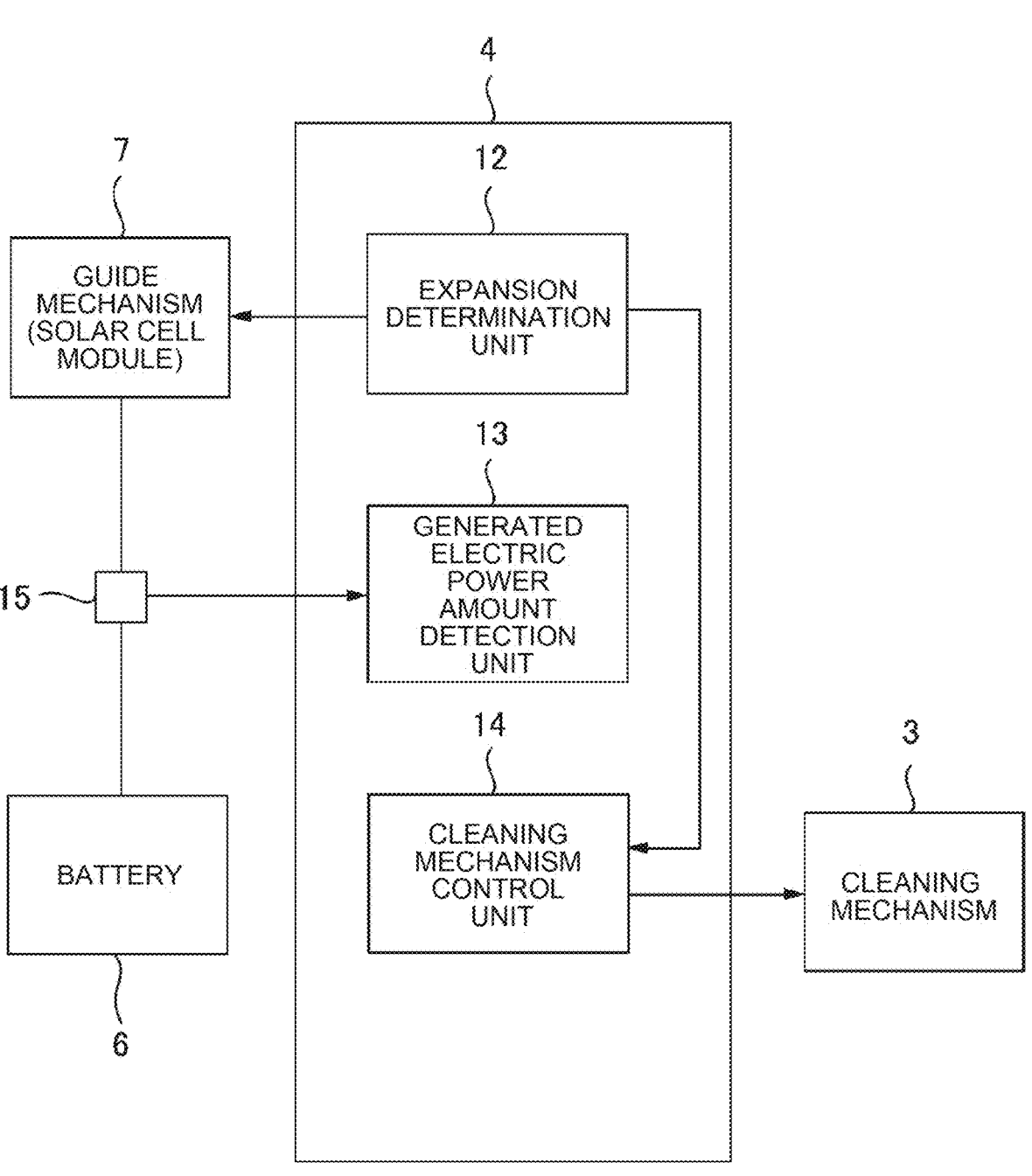
FIG. 2 is a block diagram for explaining a functional configuration of a control device according to an embodiment of the present disclosure.

In addition, the controller 4 controls the solar cell module 1 to be deployed or stored, or controls the cleaning mechanism 3 to be operated to clean the outer surface of the windshield 2. As a control configuration for this purpose, as shown in FIG. 2, the controller 4 includes an expansion determination unit 12, a generated electric power amount detection unit 13, and a cleaning mechanism control unit 14.

The expansion determination unit 12 determines that the solar cell module 1 needs to be deployed or has been deployed. When the vehicle is parked or stopped, or when it is certain that the driving force source is shut down and does not travel, the expansion determination unit 12 controls the guide mechanism 7 to deploy the solar cell module 1 along the inner surface of the windshield 2. The expansion determination unit 12 determines that the vehicle Ve is parked or stopped based on, for example, that the ignition switch of the vehicle Ve is OFF, that there is no driver or passenger in the room of the vehicle Ve, or the like. Further, the expansion determination unit 12 determines not to deploy the solar cell module 1 if it is predicted that even if such a parking or stopping is not able to effectively generate power even if the solar cell module 1 is deployed due to bad weather or the like.

The generated electric power amount detection unit 13 detects that the generated electric power amount is decreasing when the electric power is being generated by the solar cell module 1. The generated electric power amount detection unit 13 detects the generated electric power amount by the solar cell module 1 by the detector 15 such as a power sensor or a battery sensor provided between the solar cell module 1 and the battery 6 on an electrical path. The generated electric power amount detection unit 13 detects the generated electric power amount detected by the detector 15 when the electric power is generated by the solar cell module 1. Then, it is determined whether or not the generated electric power amount is lower than the generated electric power amount at the start of power generation by the solar cell module 1.

For example, the generated electric power amount detection unit 13 detects whether or not the generated electric power amount is lower than a predetermined electric power amount (predetermined value) in accordance with predetermined specifications such as the configuration and performance of the solar cell module 1, a threshold value set based on the amount of solar radiation of the solar cell module 1, and the like. When the amount of generated electric power of the solar cell module 1 is lower than a predetermined amount of electric power, it is configured to detect that the amount of generated electric power of the solar cell module 1 is lower due to dirt, foreign matter, or the like adhering to the windshield 2.

The amount of electric power generated by the solar cell module also varies depending on the amount of solar radiation, the temperature, and the like. As a result, the amount of electric power generated by the solar cell module may gradually decrease or decrease with time, and then increase. In such a case, since no dirt or foreign matter adheres to the window glass, even if the cleaning mechanism is operated, it is not possible to suppress a decrease in the amount of power generated by the solar cell module. Therefore, the generated electric power amount detection unit 13 sets a predetermined electric power amount based on the amount of sunlight, the temperature, the specifications of the solar cell module 1, and the like. This suppresses the operation of the cleaning mechanism 3 even though no dirt or foreign matter adheres to the windshield 2.

The solar cell 5 supplies the generated electric power to the battery 6 for each unit constituted by the plurality of solar cells 5. Therefore, when the power generation efficiency decreases in one solar cell 5, the power generation amount decreases as a whole unit. The generated electric power amount detection unit 13 may be configured to be able to determine that dirt or foreign matter has adhered to the windshield 2 when it is detected that the amount of decrease in the generated electric power amount in some of such units is significantly larger than the amount of decrease in the generated electric power amount in other units.

Further, when determining the predetermined amount of electric power, the generated electric power amount detection unit 13 may be configured to refer to other parameters. For example, the generated electric power amount detection unit 13 may be configured to determine by referring to parameters such as energy conversion efficiency when solar energy is converted into electricity by the solar cell module 1, solar radiation amount of sunlight, a predetermined loss coefficient generated when the solar cell module 1 generates electricity, and a system capacity of the solar cell module 1 obtained by the number of the solar cells 5. By using a plurality of these parameters in the generated electric power amount detection unit 13, it is only necessary to detect that a decrease in the amount of electric power generated by the solar cell module 1 is caused by dirt, foreign matter, or the like adhering to the windshield 2.

The cleaning mechanism control unit 14 controls the cleaning mechanism 3 so as to clean the outer surface of the windshield 2 when the expansion determination unit 12 determines to deploy the solar cell module 1. For example, the cleaning mechanism control unit 14 causes the windshield 2 to discharge the washer liquid before the solar cell module 1 is deployed. Thereafter, the cleaning mechanism control unit 14 operates the wiper 10 to clean the windshield 2 by wiping off dirt adhering to the outer surface of the windshield 2 together with the washer liquid.

In addition, when the generated electric power amount detection unit 13 detects that the generated electric power amount has decreased, the cleaning mechanism control unit 14 operates the cleaning mechanism 3 to clean the outer surface of the windshield 2. The cleaning mechanism control unit 14 is configured to operate the cleaning mechanism 3 as described above when the generated electric power amount detection unit 13 detects that the generated electric power amount of the solar cell module 1 has decreased due to dirt or foreign matter adhering to the outer surface of the windshield 2.

Figure 3:
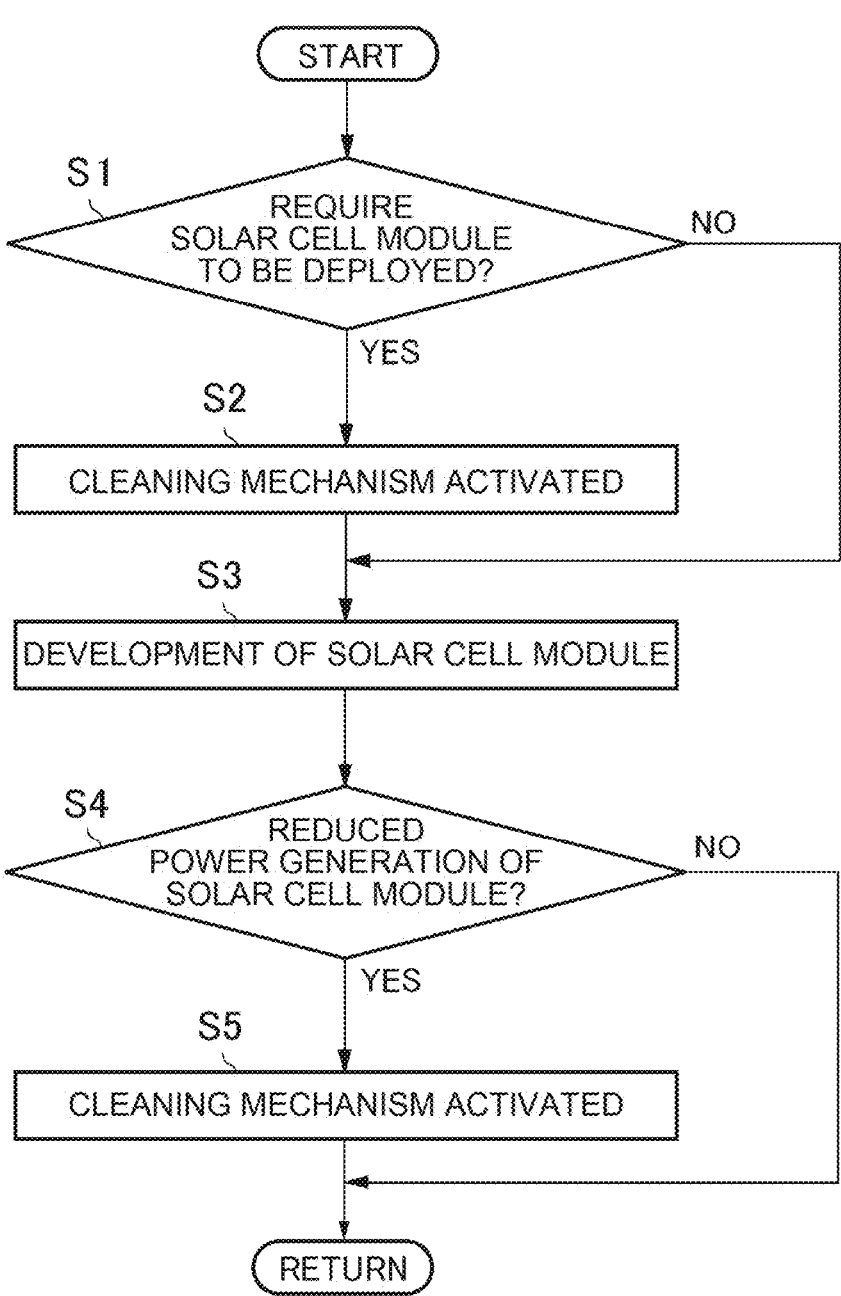
FIG. 3 is a flowchart for explaining an example of control executed by the control device according to the embodiment of the present disclosure.

Next, an example of control executed by the controller 4 in the embodiment of the present disclosure will be described based on a flowchart shown in FIG. 3. As shown in FIG. 3, S1 determines that the solar cell module 1 is deployed or has been deployed. S1 determines, for example, that the vehicle Ve has been parked or is predicted to be parked. As described above, the solar cell module 1 is deployed along the inner surface of the windshield 2. That is, since the driver or the passenger of the vehicle Ve cannot see the outside of the vehicle Ve, the solar cell module 1 is deployed during parking or stopping. When the vehicle Ve is running, when the ignition switch of the vehicle Ve is ON, or when it is determined that the solar cell module 1 is not to be deployed due to bad weather, S1 is determined to be NO. This flowchart is temporarily ended without executing the subsequent control.

The determination in S1 may be performed by operating a steering wheel, an instrument panel, or the like. That is, when the driver or the occupant operates the switch, the solar cell module 1 can be kept stored even during parking. On the contrary, even if the ignition switch is ON or a driver or a passenger is present in the vehicle cabin, the solar cell module 1 can be deployed as a sunshade. In this case, the solar cell module 1 may be configured to be stored immediately when it is predicted that the vehicle Ve starts to travel immediately, such as when the shift lever is operated to the drive position. Alternatively, the vehicle Ve may be kept unable to travel, such as preventing the shift lever from moving to the drive position.

When it is determined that S1 is YES because the vehicle is parked or stopped, the process proceeds to S2, and the cleaning mechanism 3 for cleaning the windshield 2 is operated. In S2, the cleaning mechanism 3 is operated to remove dirt and foreign matters adhering to the outer surface of the windshield 2.

After the cleaning mechanism 3 is activated, the process proceeds to S3 to deploy the solar cell module 1. In S2, dirt or foreign matter adhering to the outer surface of the windshield 2 has been removed by the cleaning mechanism 3, so that the solar cell module 1 is deployed. As described above, the solar cell module 1 drives a rotating member (not shown) of the guide mechanism 7 provided along the pillar trim by, for example, an actuator (not shown). As a result, the guide sheet 8 is spread out according to a guide rail (not shown) provided on the roof, so that the solar cell module 1 is deployed along the inner surface of the windshield 2.

After the solar cell module 1 is deployed, the solar cell module 1 and the battery 6 are electrically connected to each other, whereby power generation by the solar cell module 1 is performed. Note that the operation of the cleaning mechanism 3 in S2 and the deployment of the solar cell module 1 in S3 may be performed in the same or opposite order. That is, the outer surface cleaning of the windshield 2 may be performed not only before the solar cell module 1 is deployed but also simultaneously with the deployment of the solar cell module 1. The solar cell module 1 may be deployed before the power generation is started.

After the power generation by the solar cell module 1 is started, the process proceeds to S4. In S4, after the power generation of the solar cell module 1 is started, it is determined whether or not the power generated by the solar cell module 1 has decreased. When the solar cell module 1 starts generating electric power, the detector 15 starts detecting the amount of electric power generated by the solar cell module 1. In S4, for example, when the generated electric power amount has decreased by a predetermined generated electric power amount or more as compared with the time of starting the power generation based on the change in the generated electric power amount detected by the detector 15, it is determined that the generated electric power amount of the solar cell module 1 has decreased due to dirt or foreign matter adhering to the windshield 2.

For example, in the solar cell module 1, a plurality of predetermined solar cells 5 are connected in series by a string. As described above, the solar cell module 1 includes a plurality of connected solar cells 5 as one unit. In the solar cell module 1, it may be difficult to irradiate a part of the solar cells 5 in one unit with sunlight due to dirt or foreign matter adhering to the windshield 2. In such a case, the amount of power generated and the power generation efficiency of one unit as a whole may be lowered. S4 detects a decrease in the amount of power generated due to dirt or foreign matter adhering to the windshield 2, such as a sudden decrease in the amount of power generated by some of such units. As described above, such a predetermined amount of generated electric power is calculated based on parameters such as the performance of the solar cell module 1 and the solar radiation amount of sunlight as described above.

When a sensor or the like for detecting that dirt or foreign matter is attached to the windshield 2 is provided, S4 may be determined in accordance with the detection result of the sensor. Further, in S4, the decrease in the amount of power generated by the solar cell module 1 may be determined based on the fact that the decrease in the predetermined amount of power continues for a predetermined period of time. Accordingly, it is possible to suppress the cleaning mechanism 3 from being activated when the generated electric power is instantaneously generated by a person, an object, or the like that has passed in the vicinity of the vehicle Ve.

As described above, when it is determined that the generated electric power amount of the solar cell module 1 is not reduced due to the fact that the generated electric power amount of the solar cell module 1 is not lower than the predetermined generated electric power amount or the like as compared with the case where the electric power generation is started, S4 is determined to be NO. When such determination is made, it is determined that the windshield 2 does not need to be cleaned, and the flowchart is temporarily ended without executing the subsequent control.

On the contrary, when it is determined that S4 is YES due to, for example, a decrease in the amount of generated electric power of the solar cell module 1 by a predetermined amount of generated electric power or more as compared with a case where power generation is started, the process proceeds to S5. In such a case, it is estimated that dirt or foreign matter adheres to the windshield 2, and therefore it is determined that the outer surface of the windshield 2 needs to be cleaned. Therefore, in S5, the cleaning mechanism 3 is activated to perform cleaning of the outer surface of the windshield 2.

Note that the control after S4 in the embodiment of the present disclosure may be repeatedly executed at predetermined intervals. That is, the control of S4 may be executed every time a predetermined period of time elapses when it is determined as NO in S4 or when S5 process is executed. Accordingly, even when dirt or foreign matter adheres to the windshield 2, it is possible to quickly remove the dirt or foreign matter.

As described above, the solar cell module 1 according to the embodiment of the present disclosure can be selectively deployed along the inner surface of the windshield 2 of the vehicle Ve. Specifically, when the vehicle Ve is traveling, the solar cell module 1 is wound up on the pillar 9, the pillar trim, or the like of the windshield 2, or is stored in a folded condition. Therefore, it is possible to secure the field of view of the driver and the occupant while the vehicle Ve is traveling. When the vehicle is parked, the solar cell module 1 is deployed along the inner surface of the windshield 2 of the vehicle Ve by the guide mechanism 7. Therefore, since the installation area of the solar cell module 1 in the vehicle Ve can be increased, the generated electric power of the solar cell module 1 can be increased. Further, since the solar cell module 1 is deployed along the inner surface of the windshield 2, it is possible to suppress sunlight from being emitted into the vehicle cabin. The solar cell module 1 functions as a so-called sunshade. An increase in temperature in the vehicle cabin is suppressed.

When the solar cell module 1 is deployed, the wiper 10 on Ve of the vehicle and the cleaning mechanism 3 such as a washer liquid are activated to clean the outer surface of the windshield 2. That is, the solar cell module 1 is deployed in a state in which dirt, foreign matter, or the like of the windshield 2 is removed. Therefore, it is possible to suppress a decrease in the amount of power generated by the solar cell module 1 due to dirt or foreign matter adhering to the windshield 2.

In addition, the cleaning mechanism 3 is operated even when the amount of generated electric power decreases while the solar cell module 1 generates electric power. That is, when it is estimated that the amount of power generated by the solar cell module 1 is reduced due to the adhesion of dirt or foreign matter to the windshield 2, the outer surface of the windshield 2 is cleaned by the cleaning mechanism 3. Since the vehicle Ve is parked outdoors to generate electric power by the solar cell module 1, dirt or foreign matter may adhere to the windshield 2 during power generation. Therefore, when the amount of power generated by the solar cell module 1 decreases, the cleaning mechanism 3 cleans the outer surface of the windshield 2. This suppresses the power generation of the solar cell 5 from being hindered by dirt or foreign matter in the windshield 2.

Further, the cleaning mechanism 3 is operated when the amount of generated electric power decreases by a predetermined amount of electric power or more as compared with when the power generation by the solar cell module 1 is started. For example, the amount of electric power generated by the solar cell module also varies depending on the amount of solar radiation, the temperature, and the like. Due to such a factor, the amount of electric power generated by the solar cell module may decrease with the passage of time. Therefore, by determining whether or not the amount of decrease in the amount of generated electric power of the solar cell module is equal to or greater than a predetermined amount of electric power, it is possible to determine whether or not the amount of generated electric power of the solar cell module is changed due to such a factor.

The predetermined amount of electric power is set based on the performance of the solar cell module 1, external factors such as the amount of solar radiation, and the like. Therefore, it is possible to estimate whether or not the amount of generated electric power is reduced due to dirt or adhesion of foreign matters to the windshield 2. That is, when it is estimated that the amount of generated electric power is reduced due to dirt or foreign matter adhering to the windshield 2, the outer surface of the windshield 2 is cleaned by the cleaning mechanism 3. Therefore, it is possible to suppress the cleaning mechanism 3 from being operated even though no dirt or foreign matter adheres to the windshield 2.

If the amount of electric power generated by the solar cell module 1 is not lower than a predetermined amount of electric power in spite of dirt or foreign matter adhering to the windshield 2, the dirt or foreign matter adhering to the window glass cannot be removed. However, since the amount of generated electric power of the solar cell module 1 is not lower than a predetermined amount of electric power, even in such a case, it is possible to suppress a significant decrease in the amount of generated electric power of the solar cell module. Therefore, it is possible to suppress a decrease in the amount of power generated by the solar cell module while reducing the number of operations of the cleaning mechanism 3.

Although the embodiments of the present disclosure have been described above, the present disclosure is not limited to the above-described examples, and may be appropriately modified within the scope of achieving the object of the present disclosure. For example, the solar cell module 1 is not limited to being deployed along the inner surface of the windshield 2 of the vehicle Ve, and may be deployed on a side glass, a rear glass, or the like on the vehicle Ve. When the solar cell module 1 is mounted on the rear glass, the cleaning mechanism 3 may be operated when the solar cell module 1 is deployed or when dirt or foreign matter in the rear glass is detected as in the above-described embodiment. In addition, the solar cell module 1 may be attached to a hood, a roof, a hood, a backdoor, or the like of a vehicle Ve.

What is claimed is:

1. A control device for a vehicle including:
   a window glass;
   a cleaning mechanism configured to clean an outer surface of the window glass; and
   a solar cell module configured to generate electric power by irradiation with sunlight and having flexibility,
   the solar cell module being expandable along an inner surface of the window glass and retractable to an outside of the inner surface of the window glass, the control device comprising a controller configured to control expansion and retraction of the solar cell module and to control the cleaning mechanism, wherein the controller includes:

an expansion determination unit configured to determine whether to expand the solar cell module along the inner surface of the window glass; and a cleaning mechanism control unit configured to operate the cleaning mechanism to clean the outer surface of the window glass when the expansion determination unit determines to expand the solar cell module.

2. The control device according to claim 1, further comprising a detector configured to detect a generated electric power amount of the solar cell module, wherein:

the controller further includes a generated electric power amount detection unit configured to detect that the generated electric power amount is smaller than a predetermined value when the solar cell module is generating electric power; and the cleaning mechanism control unit is configured to operate the cleaning mechanism to clean the outer surface of the window glass when the generated electric power amount detection unit detects that the generated electric power amount is smaller than the predetermined value.

3. The control device according to claim 2, wherein the predetermined value is a value set based on a decrease amount of the generated electric power amount that is a difference between the generated electric power amount when the solar cell module is expanded and starts power generation and a current generated electric power amount.

4. The control device according to claim 2, wherein the predetermined value is a threshold value set based on a radiation amount of the sunlight that irradiates the solar cell module and predetermined specifications of the solar cell module.

* * * * *